United States Patent
Tsuda

(10) Patent No.: US 7,633,546 B2
(45) Date of Patent: Dec. 15, 2009

(54) IMAGE CAPTURE APPARATUS

(75) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 11/352,225

(22) Filed: Feb. 13, 2006

(65) Prior Publication Data

US 2006/0192884 A1    Aug. 31, 2006

(30) Foreign Application Priority Data

Feb. 28, 2005    (JP)    ............... 2005-053893

(51) Int. Cl.
*H04N 5/225*    (2006.01)
*G03B 7/24*    (2006.01)

(52) U.S. Cl. ...................... 348/360; 396/209

(58) Field of Classification Search ............... None
See application file for complete search history.

(56) References Cited

U.S. PATENT DOCUMENTS

| | | | |
|---|---|---|---|
| 6,930,723 B1 * | 8/2005 | Tsuda et al. | 348/363 |
| 7,042,499 B1 * | 5/2006 | Kido et al. | 348/211.14 |
| 7,199,830 B1 * | 4/2007 | Tanaka et al. | 348/362 |
| 7,557,857 B2 * | 7/2009 | Tsuda et al. | 348/360 |
| 2002/0003962 A1 * | 1/2002 | Park | 396/429 |
| 2004/0012708 A1 * | 1/2004 | Matherson | 348/342 |

FOREIGN PATENT DOCUMENTS

| | | |
|---|---|---|
| CN | 1332389 A | 1/2002 |
| JP | 2003-283923 | 10/2003 |

* cited by examiner

*Primary Examiner*—Justin P Misleh
(74) *Attorney, Agent, or Firm*—Fitzpatrick, Cella, Harper & Scinto

(57) ABSTRACT

An image capture apparatus can immediately start image recording capable of preventing the deterioration of image quality, even when brightness of an object immediately after the activation of a power source is higher than a reference value. A filter control circuit automatically inserts a filter for reducing the transmitting light amount of an image capture optical system into the optical path of the optical system regardless of the state of a switch for inserting or withdrawing the filter, when the brightness of the object is higher than the reference value immediately after the activation of the power source. Moreover, the filer control circuit automatically withdraws the filter from the optical path regardless of the state of the switch, when the brightness of the object is lower than the reference value immediately after the activation of the power source.

4 Claims, 4 Drawing Sheets

IMAGE CAPTURE APPARATUS

BACKGROUND OF THE INVENTION

1. Field of the Invention

The present invention relates to an image capture apparatus including a neutral density (ND) filter which is inserted into or withdrawn from an optical path of an image capture optical system.

2. Description of Related Art

An image capture apparatus with an ND filter which is inserted into or withdrawn from an optical path of an image capture optical system in accordance with the brightness of an object is disclosed in Japanese Patent Application Laid-Open No. 2003-283923.

FIG. 3 is a block diagram showing an example of a conventional image pickup apparatus 300 of this kind. The image pickup apparatus may be an electronic still camera or a video camera. In the figure, a reference numeral 301 denotes a lens which is the image capture optical system. A reference numeral 302 denotes the ND filter (achromatic color light reduction filter), which reduces the transmitting light amount of the image capture optical system. A reference numeral 303 denotes an iris for adjusting the light amount. A reference numeral 304 denotes an image capture device such as a CCD. A reference numeral 305 denotes a correlated double sampling (CDS)/auto gain control (AGC) circuit. A reference numeral 306 denotes a luminance signal detection circuit for detecting a luminance signal from an image signal output from the CDS/AGC circuit 305. A reference numeral 311 denotes an iris control signal generation circuit which generates a control signal for controlling the iris 303 according to the luminance information output from the luminance signal detection circuit 306. A reference numeral 308 denotes an iris driver which drives the iris 303 based on a control signal from the iris control signal generation circuit 311.

A reference numeral 310 denotes an ND filter insertion/withdrawal switch-over switch for switching over the insertion or the withdrawal of the ND filter 302 in conformity with the intension of a user. The switch 310 is not the switch such as a slide switch, which holds the state thereof and results in the storage of the on/off state thereof. The switch 310 is generally the switch such as a push switch, which does not hold the state thereof and results in the non-storage of the on/off state thereof. In other words, the switch 310 is the switch for switching over the ND filter 302, which is in either sate of the insertion state thereof and the withdrawal state thereof, from one state to the other state by each same operation. The user cannot judge which state of the insertion state and the withdrawal sate the ND filter 302 is in only by viewing the state of the switch 310.

A reference numeral 312 denotes an ND control signal generation circuit which generates a control signal for controlling the switch-over of the ND filter 302 from one sate to the other state according to a key operation of the ND filter insertion/withdrawal switch-over switch 310. A reference numeral 309 denotes an ND driver for driving the ND filter 302 based on a control signal from the ND control signal generation circuit 312. A reference numeral 307 denotes an electric power switch operated when the user switches over a power source of the main body of the camera to the on-state thereof or the off-state thereof.

When the user carries out the key operation of the electric power switch 307, the power source of the main body of the camera is turned on, and the image capture apparatus 300 having the configuration mentioned above starts image capturing. As the luminance signal used when exposure is controlled, a luminance signal including high frequency components of an image signal output from the CDS/AGC circuit 305 is used. The luminance signal is detected by the luminance signal detection circuit 306, and then is sent to the iris control signal generation circuit 311. The iris control signal generation circuit 311 compares the luminance signal detected by the luminance signal detection circuit 306 with a reference value (the level of appropriate exposure) previously determined to keep the luminance signal constant, and generates an iris control signal. More specifically, the iris control signal generation circuit 311 compares the luminance signal detected by the luminance signal detection circuit 306 with the reference value, and generates a control signal for operating the iris 303 to move it toward closing in case of "the luminance signal>the reference value." On the other hand, the iris control signal generation circuit 311 generates a control signal to operate the iris 303 toward opening in case of "the luminance signal<the reference value." The control signals generated in such a way are supplied to the iris driver 308, and the iris 303 is driven. By always carrying out the control mentioned above, it becomes possible to make the exposure state be in the optimum state.

Here, the ND filter 302 is described in detail. The ND filter 302 is configured so as to be in the withdrawal state thereof just after the user has turned on the power source of the main body of the camera by operating the electric power switch 307. When the user wishes to insert the ND filter 302 into the optical path from this state, the ND filer 302 is inserted therein by the key operation of the ND filer insertion/withdrawal switch-over switch 310 by the user. Moreover, when the ND filter 302 which is in the insertion state thereof is desired to be withdrawn from the optical path, the ND filer 302 is withdrawn from the optical path by another key operation of the ND filter insertion/withdrawal switch-over switch 310. For example, in the case where brightness of an object is high out of doors or the like, a diffraction phenomenon is sometimes brought about owing to a decrease of the diameter of the iris 303, and results in a deterioration of the image quality of the image of the object. Inserting the ND filter 302 into the optical path in order to avoid this disadvantage will make it possible to obtain a good quality image. Moreover, in the case where brightness of an object is low within doors or the like, withdrawing the ND filter 302 from the optical path in order to obtain good sensitivity will make it possible to obtain a good quality image.

Using the block diagram of FIG. 3, the operation of the ND filter 302 at the time of the insertion into or the withdrawal from the optical path is described. When a key operation of the ND filer insertion/withdrawal switch-over switch 310 is once carried out by a user in the case where the ND filter 302 is in the withdrawal state thereof from the optical path, the ND control signal generation circuit 312 generates a control signal for inserting the ND filter 302 into the optical path. The generated control signal is supplied to the ND driver 309, and then the ND filter 302 is inserted into the optical path. When another key operation of the ND filer insertion/withdrawal switch-over switch 310 is carried out by the user in this state, the ND control signal generation circuit 312 generates a control signal for withdrawing the ND filter 302. The control signal is supplied to the ND driver 309, and the ND filter 302 is withdrawn from the optical path.

Next, by reference to the flowchart of FIG. 4, control operations of the iris 303 and the ND filter 302 immediately after the turning-on of the power source of the main body of the camera are described.

At a step 401, a user carries out a key operation of the electric power switch 307, and the power source of the main body of the camera becomes in the on state thereof. Then, the ND filter insertion/withdrawal switch-over switch 310 is made to be in an invalidated state at the next step 402. And, at the next step 403, the luminance signal detection circuit 306 detects a luminance signal including high frequency components of an image signal output from the CDS/AGC circuit 305. At the successive step 404, the iris control signal generation circuit 311 compares the detected signal with a predetermined reference value (an appropriate exposure level) to generate a control signal for controlling the iris 303. For example, when the detected signal is larger than the reference value as a result of the comparison of the detected signal with the reference value, the iris control signal generation circuit 311 generates a control signal for controlling the iris 303 toward the closing thereof. On the other hand, when the detected signal is smaller than the reference value, the iris control signal generation circuit 311 generates a control signal for controlling the iris 303 toward the opening thereof. Then, at the next step 405, the iris control signal generation circuit 311 supplies the control signal generated at the step 404 to the iris driver 308 to drive the iris 303.

At the next step 406, the iris control signal generation circuit 311 generates a control signal for withdrawing the ND filter 302 from the optical path in order to create a previously withdrawn state of the ND filter 302 after the turning-on of the power source. Then, at the next step 407, the iris control signal generation circuit 311 supplies the control signal generated at the step 406 to the ND driver 309 to withdraw the ND filter 302 to the outside of the optical path. Then, at the next step 408, the iris control signal generation circuit 311 validates the ND filter insertion/withdrawal switch-over switch 310, which has been invalidated at the step 402.

The camera having the ND filter mentioned above has been scarcely adopted as a camera in a popular type class. The following reasons can be considered of the nonadoption of the camera having the ND filter: the using method of the camera becomes troublesome; the main body of the camera becomes larger; the cost of the camera becomes expensive; and the like. However, the camera having the ND filer has been considerably generally adopted as a camera in a quality type class.

Now, in the image capture apparatus 300 mentioned above, it cannot be judged only by viewing the state of the switch 310 which state of the insertion and the withdrawal the ND filter 302 is in. Consequently, when a user does not remember which state of the insertion and the withdrawal the ND filter 302 is in at the time of turning off the power source of the main body of the camera, it is difficult for the user to immediately grasp which state of the insertion and the withdrawal the ND filter 302 is in when the power source is next turned on. Moreover, when the ND filter 302 is in the insertion state thereof, the amount of the light reaching the image capture device 304, of course, decreases more than the decreased amount at the time of being in the withdrawal state thereof. Consequently, it is impossible to obtain sufficient luminance at the time of carrying out photographing within doors. Accordingly, the image capture apparatus mentioned above, as shown in FIG. 4, controls the ND filter 302 to be in the withdrawal state thereof just after the turning-on of the power source of the main body of the camera. However, under such a configuration, even when recording is desired to be begun immediately after the turning-on of the power source of the main body of the camera, the ND filter 302 is always in the withdrawal state thereof. Consequently, for example, when the brightness of an object is low within doors or the like, good photographing can be carried out. But, when the brightness of an object is high out of doors or the like, because the ND filter 302 is being left in the withdrawal state thereof, the iris 303 becomes the state of having a small diameter, and the diffraction phenomenon is brought about.

It is, of course, possible to start recording in this state as it is, but, because the diffraction phenomenon has the possibility of causing the deterioration of image quality, good photographing cannot be always carried out. In such a case, the user is required to carry out the key operation of the ND filter insertion/withdrawal switch-over switch 310 in order to switch over the insertion/withdrawal state of the ND filter 302, and to switch over the ND filter 302 from the withdrawal state thereof to the insertion state thereof. That is, in the case where the photographing when the user wants to start recording immediately after the turning-on (activation) of the power source of the main body of the camera is to be performed in the state in which the brightness of the object is high out of doors or the like, the user is required to carry out the operation of inserting the ND filter 302 into the optical path. Because the user has to insert the ND filter into the optical path by carrying out the key operation of the ND filter insertion/withdrawal switch-over switch 310, the image capture apparatus 300 has a problem of the impossibility of the instantaneous starting of recording.

SUMMARY OF THE INVENTION

The present invention concerns an image capture apparatus capable of the instantaneous starting of the image recording with the reduction of the deterioration of image quality even if the brightness of an object is higher than a reference value after the activation of a power source.

Specifically, according to an aspect of the present invention, there is provided an image capture apparatus comprising: a filter, arranged to reduce a transmitting light amount of an image capture optical system by being inserted into an optical path of the image capture optical system; a filter control circuit, arranged to insert or withdraw the filter into or from the optical path; a switch-over switch operative when the filter being in one of insertion and withdrawal states is switched over to the other state; and an electric power switch, arranged activate a power source, wherein, when the power source is activated by the electric power switch, the filter control circuit automatically inserts the filter into the optical path regardless of the state of the switch-over switch when brightness of an object is higher than a reference value, while the filter control circuit automatically withdraws the filter from the optical path when the brightness of the object is lower than the reference value.

DESCRIPTION OF THE PREFERRED EMBODIMENTS

The following description of at least one exemplary embodiment is merely illustrative in nature and is in no way intended to limit the invention, its application, or uses.

Techniques, apparatus, and materials as known by one of ordinary skill in the relevant art may not be discussed in detail but are intended to be part of the enabling description where appropriate.

Exemplary embodiments will be described in detail below with reference to the drawings.

Figure 1:
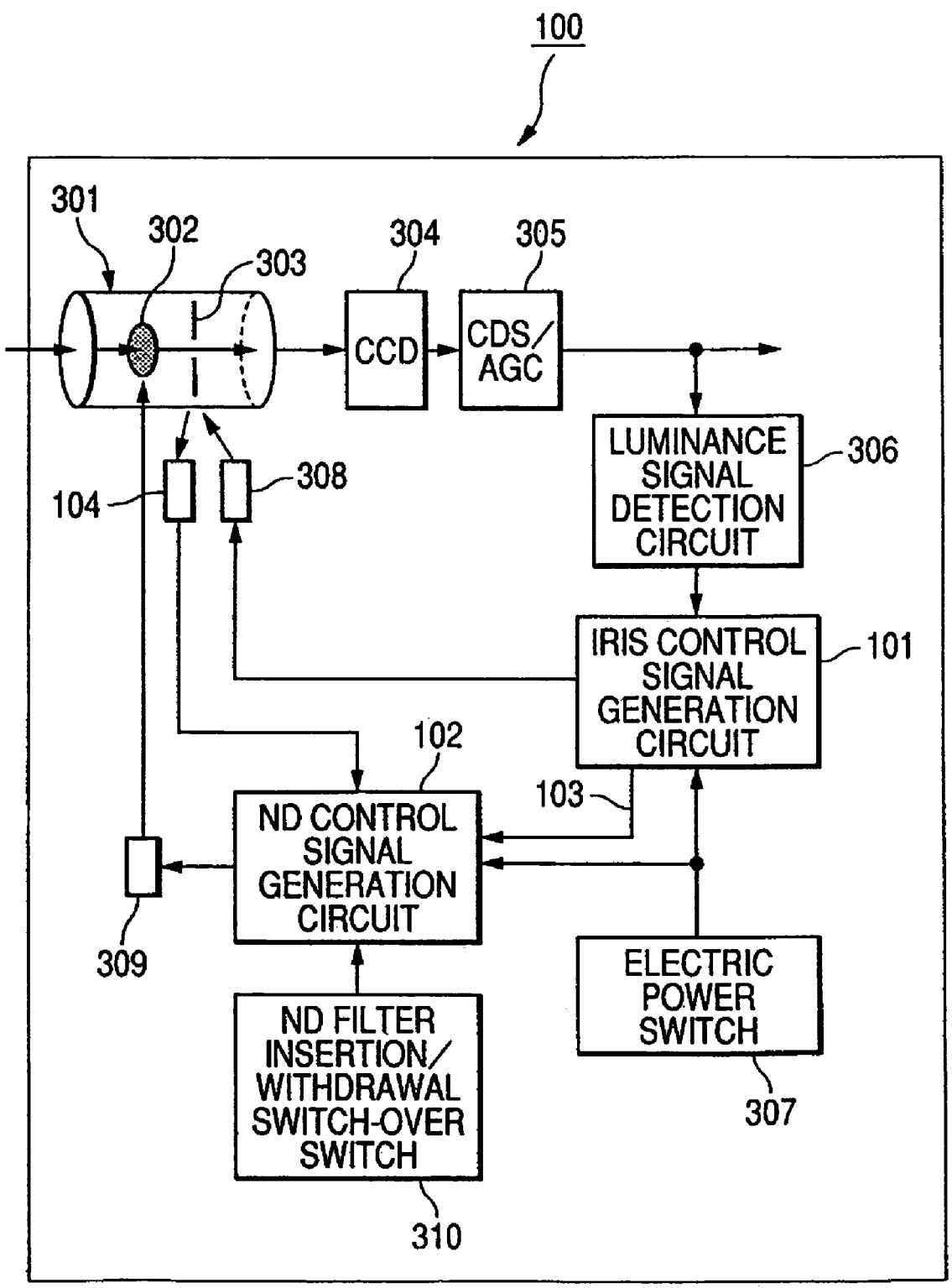
FIG. 1 is a block diagram showing the circuit configuration of an image capture apparatus according to an embodiment of the present invention.
Figure 3:
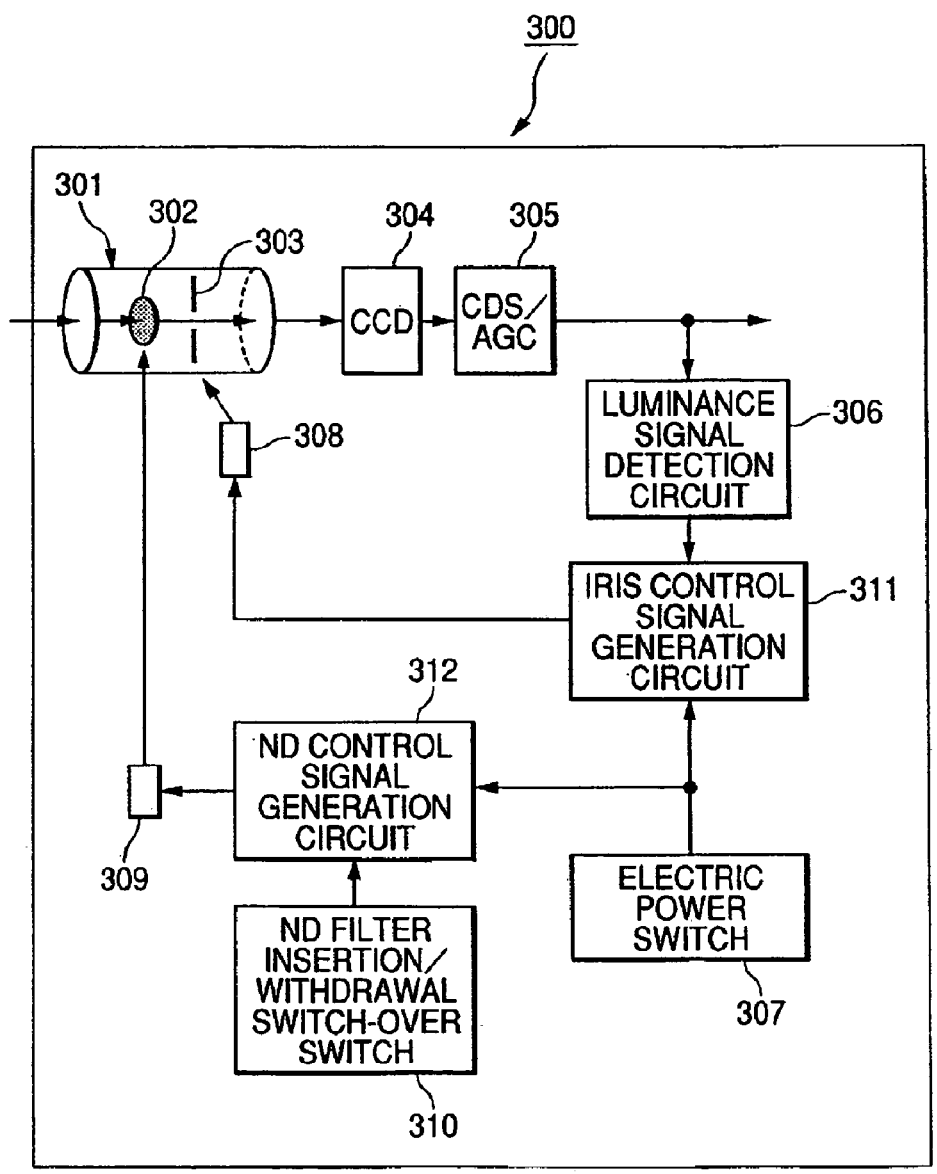
FIG. 3 is a block diagram showing the circuit configuration of an example of a conventional image capture apparatus.

FIG. 1 is a block diagram showing the circuit configuration of an image capture apparatus 100 according to an embodiment of the present invention. In the figure, because the constituent elements denoted by the reference numerals 301-310 are the same as those shown in FIG. 3, their descriptions are omitted. In the following, the constituent elements different from those shown in FIG. 3 are described with stress being laid on them.

In FIG. 1, a reference numeral 101 denotes an iris control signal generation circuit, which generates a control signal of the iris 303 according to a luminance signal output from the luminance signal detection circuit 306. The iris control signal generation circuit 101 has a function of outputting a signal indicating the appropriateness of exposure when the exposure becomes appropriate by the drive of the iris 303 in conformity with the control signal. A reference numeral 102 denotes an ND control signal generation circuit generating a control signal for controlling the ND filter 302, in accordance with the key operations of the ND filter insertion/withdrawal switch-over switch 310 and a signal from a signal line 103, which will be described later. The ND control signal generation circuit 102 and the ND driver constitute a filter control circuit. The reference numeral 103 denotes the signal line for transmitting the signal indicating a judgment result of the appropriateness of the exposure by the iris control signal generation circuit 101 to the ND control signal generation circuit 102. A reference numeral 104 denotes an F value detection circuit for detecting an F value (aperture value) of the iris 303.

When the user carries out the key operation of the electric power switch 307, the power source of the main body of the camera is turned on, and the image capture apparatus 100 of the configuration mentioned above starts image capturing. As the luminance signal used when the exposure is controlled, a luminance signal including high frequency components of an image signal output from the CDS/AGC circuit 305 is used. The luminance signal is detected by the luminance signal detection circuit 306, and then is sent to the iris control signal generation circuit 101. The iris control signal generation circuit 101 operates a control signal for controlling the iris 303, by comparing the luminance signal detected by the luminance signal detection circuit 306 with a reference value (the level of appropriate exposure) previously determined to keep the luminance signal constant. More specifically, the iris control signal generation circuit 101 compares the luminance signal detected by the luminance signal detection circuit 306 with the reference value, and generates a control signal for driving the iris 303 toward closing in case of "the luminance signal>the reference value." On the other hand, the iris control signal generation circuit 101 generates a control signal for driving the iris 303 toward opening in case of "the luminance signal<the reference value." The control signal generated in such a way is supplied to the driver 308, and the iris 303 is driven." By carrying out the control mentioned above always, it becomes possible to make the exposure state be in the most suitable state. Moreover, the-iris control signal generation circuit 101 has the function of carrying out the judgment of whether the exposure state has become optimum or not for the first time just after the turning-on of the power source, and transmits a signal indicating the obtainment of the optimum exposure to the ND control signal generation circuit 102 through the signal line 103 when the optimum exposure has been obtained.

The ND control signal generation circuit 102 detects the F value information of the iris 303 from the F value detection circuit 104 on the basis of the transmission timing of the signal through the signal line 103, and judges whether the object is bright or dark based on the F value information. Here, when the ND control signal generation circuit 102 judges that the object is brighter than the reference value, the ND control signal generation circuit 102 generates a control signal for inserting the ND filter 302 into the optical path. On the other hand, when the ND control signal generation circuit 102 judges that the object is darker than the reference signal, the ND control signal generation circuit 102 generates a control signal for withdrawing the ND filter 302. The control signal generated in such a way is supplied to the ND driver 309, and the ND filter 302 is switched over into the insertion state thereof or the withdrawal state thereof.

Figure 2:
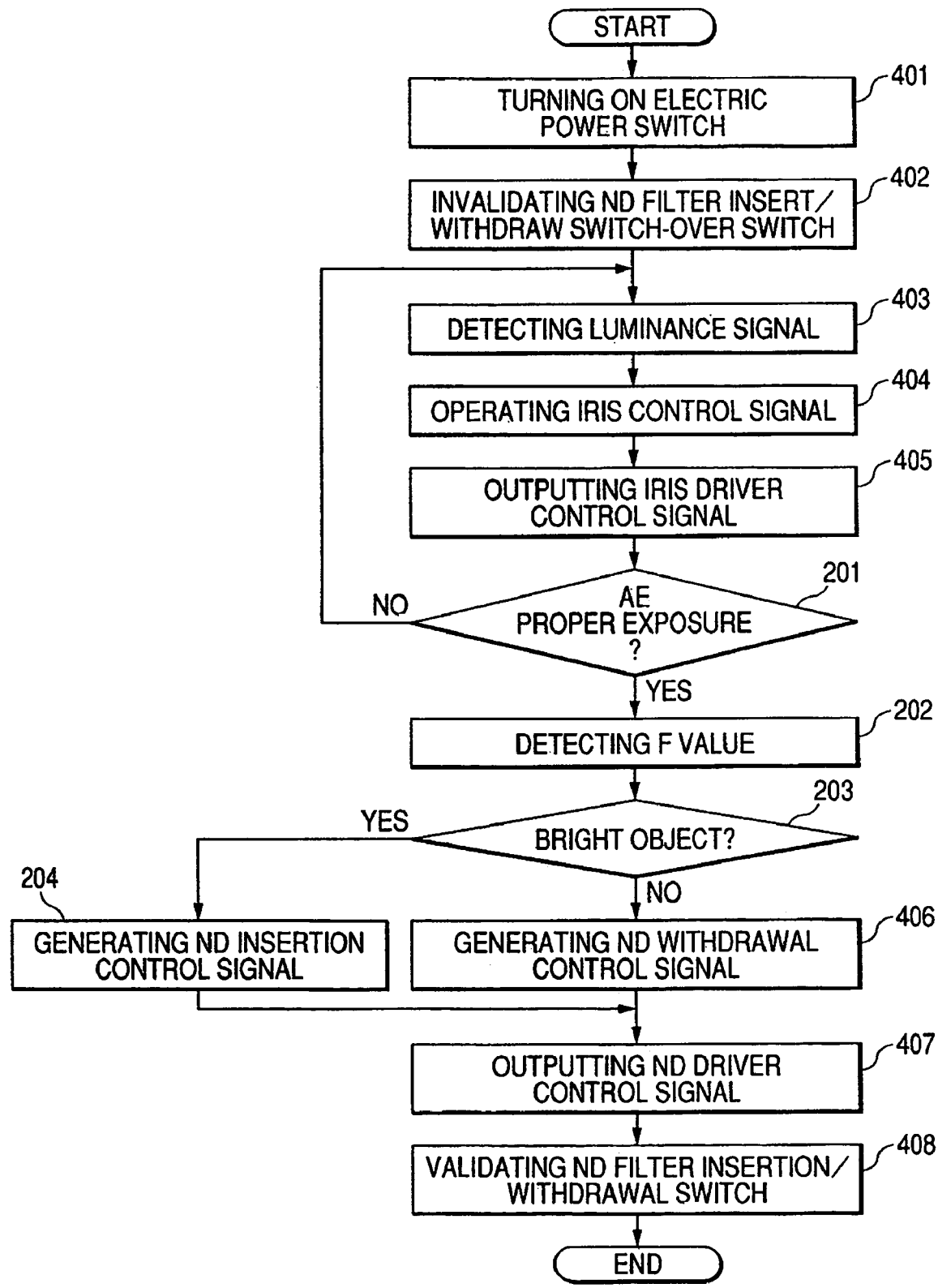
FIG. 2 is a flowchart showing a control operation of an iris and an ND filter in the image capture apparatus of FIG. 1.
Figure 4:
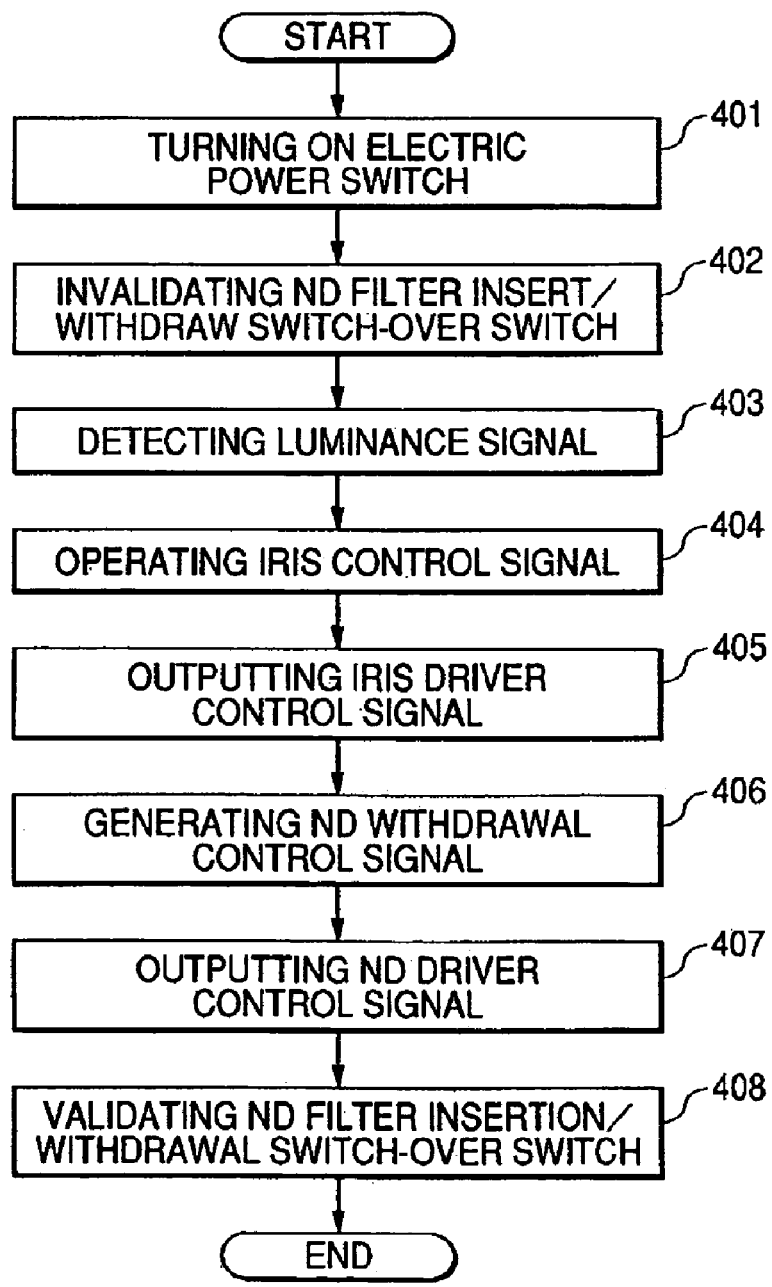
FIG. 4 is a flowchart showing a control operation of an iris and an ND filter in the image capture apparatus of FIG. 3.

Next, by reference to the flowchart of FIG. 2, control operations of the iris 303 and the ND filter 302 immediately after the turning-on of the power source of the main body of the camera are described. Incidentally, the steps at which the same operations as those shown by the flowchart of FIG. 4 are carried out are denoted by the same step numbers as those in the flowchart of FIG. 4.

At a step 401, the user carries out a key operation of the electric power switch 307, and the power source of the main body of the camera becomes in the on-state thereof. Then, at the next step 402, the ND filter insertion/withdrawal switch-over switch 310 is made to be in an invalidated state. Then, at the next step 403, a luminance signal including high frequency components of an image signal output from the CDS/AGC circuit 305 is detected. At the successive step 404, the detected signal is compared with a predetermined reference value (an appropriate exposure level), and a control signal for controlling the iris 303 is generated. For example, when the detected signal is larger than the reference value as a result of the comparison of the detected signal with the reference value, a control signal for controlling the iris 303 toward the closing thereof is generated. On the other hand, when the detected signal is smaller than the reference value, a control signal for controlling the iris 303 toward the opening thereof is generated. Then, at the next step 405, the control signal generated at the step 404 is supplied to the iris driver 308, and the iris 303 is driven.

At the next step 201, it is judged whether the exposure has become appropriate by the drive of the iris 303 or not. When the exposure is not appropriate, the operations from the step 403, 404, 405 to 201 are repeated until the exposure becomes appropriate. Then, when the exposure has become a stable appropriated value, the processing advances to a step 202, and the F value of the iris 303 at that time is detected. Then, at the next step 203, the judgment of whether the object is bright or dark is carried out based on the detected F number. As the result of the judgment, when the object is judged to be bright, the processing advances to a step 204, and the control signal for inserting the ND filter 302 is generated here. Moreover, when the object is judged to be dark, the processing advances from the step 203 to the step 406, and the control signal for withdrawing the ND filter 302 from the optical path is generated. After that, in each of both cases, the processing advances to the step 407, and the control signal generated at the step 204 or 406 is supplied to the ND driver 309, and the ND filter 302 is made to be in the state of being inserted into or withdrawn from the optical path. Thus, when the state of the insertion or the withdrawal of the ND filter 302 immediately after the turning-on of the power source has been determined, the ND filter insertion/withdrawal switch-over switch 310 is validated at the next step 408, and the insertion or the withdrawal of the ND filter 302 is left to the judgment of the user after that.

As described above, when the user carries out image recording immediately after the activation of the power source of the main body of the camera, the iris 303 is in the state of having a small diameter in the case where the brightness of the object at this time is higher than the reference value, and there is the possibility of bringing about the deterioration of image quality owing to the diffraction phenomenon. Accordingly, in the present embodiment, it is automatically judged immediately after the activation of the power source whether the brightness of the object is higher or lower than the reference value. When the brightness of the object is higher than the reference value out of doors or the like, the state of the camera is automatically changed to the state of the automatic insertion of the ND filter 302 into the optical path regardless of the key operation of the ND filter insertion/withdrawal switch-over switch 307 (at the step 204 in FIG. 4).

Consequently, even when the brightness of the object immediately after the activation of the power source is higher than the reference value, it becomes possible to start image recording having no diffraction phenomenon to enable to prevent the deterioration of image quality immediately after the activation of the power source.

Moreover, because the ND filter is automatically inserted into the optical path only at the time of the high brightness immediately after the turning-on of the power source, the key operations of the user for inserting/withdrawing the ND filter can be decreased on the contrary of the prior art. As the result, the load of the user during photographing can be reduced.

Incidentally, although the judgment of the brightness of the object is carried on based on the detected F value, the judgment is not limited to the method. For example, the judgment may be carried on based on the output of the luminance signal detection circuit 306.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-053893 filed on Feb. 28, 2005, which is hereby incorporated by reference herein.

What is claimed is:

1. An image capture apparatus comprising:
   a filter, arranged to reduce a transmitting light amount of an image capture optical system by being inserted into an optical path of the image capture optical system;
   a filter control circuit, arranged to insert or withdraw the filter into or from the optical path;
   a switch-over switch operative by a user to generate a signal for causing the filter control circuit to switch the filter to one of an insertion state and a withdrawal state in response to a user operation; and
   an electric power switch, arranged to activate a power source,
   wherein, when the power source is activated by the electric power switch, the filter control circuit makes the signal from the switch-over switch invalid to control the filter in accordance with an object state so as to automatically insert the filter into the optical path when a brightness of an object is higher than a reference value, and to automatically withdraw the filter from the optical path when the brightness of the object is lower than the reference value.

2. An image capture apparatus according to claim 1, wherein the switch-over switch can be operated to switch over the filter to the insertion state thereof or the withdrawal state thereof after the power source has been activated with the electric power switch and the filter has been automatically made to be in the insertion state thereof or the withdrawal state thereof by the filter control circuit.

3. An image capture apparatus according to claim 1, wherein the switch-over switch is a switch that does not store a state thereof.

4. An image capture apparatus according to claim 1, wherein the filter control circuit judges whether the brightness of the object is higher than the reference value based on an aperture value of an iris device that controls the transmitting light amount of the filter after the power source has been activated.

\* \* \* \* \*